United States Patent
Swan (10) Patent No.: US 8,786,781 B2
(45) Date of Patent: Jul. 22, 2014

(54) DETECTION AND ENHANCEMENT OF IN-VIDEO TEXT

(75) Inventor: Philip Swan, Richmond Hill (CA)

(73) Assignee: ATI Technologies ULC, Markham, Ontario (CA)

( * ) Notice: Subject to any disclaimer, the term of this patent is extended or adjusted under 35 U.S.C. 154(b) by 982 days.

(21) Appl. No.: 12/421,216

(22) Filed: Apr. 9, 2009

(65) Prior Publication Data

US 2010/0259676 A1 Oct. 14, 2010

(51) Int. Cl.
*H04N 5/50* (2006.01)
*H04N 5/445* (2011.01)

(52) U.S. Cl.
USPC .............. 348/569; 348/564; 348/589

(58) Field of Classification Search
CPC ....... H04N 5/50; H04N 5/445; H04N 21/435; H04N 2201/325; H04N 2201/3273; H04N 2201/3274; H04N 2201/328
USPC ................. 348/569, 563–565, 589, 598–600, 348/553–555, 465, 468; 345/545, 87
IPC ............................................. H04N 5/50, 5/445
See application file for complete search history.

(56) References Cited

U.S. PATENT DOCUMENTS

| | | | |
|---|---|---|---|
| 5,684,542 A | 11/1997 | Tsukagoshi | |
| 5,731,847 A | 3/1998 | Tsukagoshi | |
| 5,889,564 A | 3/1999 | Tsukagoshi | |
| 5,913,009 A | 6/1999 | Kuboji | |
| 5,929,927 A | 7/1999 | Rumreich | |
| 5,946,046 A | 8/1999 | You | |
| 5,959,687 A | 9/1999 | Dinwiddie | |
| 5,978,046 A | 11/1999 | Shintani | |
| 6,097,442 A | 8/2000 | Rumreich | |
| 6,462,746 B1 * | 10/2002 | Min et al. | 345/545 |
| 6,663,244 B1 | 12/2003 | Wichner | |
| 6,741,323 B2 | 5/2004 | Plunkett | |
| 7,474,356 B2 * | 1/2009 | Lee | 348/569 |
| 7,742,105 B2 * | 6/2010 | Lee et al. | 348/569 |
| 7,773,852 B2 * | 8/2010 | Nanba | 386/332 |
| 2006/0170824 A1 * | 8/2006 | Johnson et al. | 348/569 |
| 2007/0189724 A1 | 8/2007 | Wan et al. | |

* cited by examiner

Primary Examiner — Trang U Tran
(74) Attorney, Agent, or Firm — Volpe and Koenig, P.C.

(57) ABSTRACT

The present disclosure relates to methods and apparatus for detecting text information in a video signal that includes subtitles, captions, credits, or other text, and also for applying enhancements to the display of text areas in video. The sharpness and/or contrast ratio of subtitles of detected text areas may be improved. Text areas may be displayed in a magnified form in a separate window on a display, or on a secondary display. Further disclosed are methods and apparatus for extending the duration for which subtitles appear on the display, for organizing subtitles to be displayed in a scrolling format, for allowing the user to control when a subtitle advances to the next subtitle using a remote control, and for allowing a user to scroll back to a past subtitle in cases where the user has not finished reading a subtitle. Additionally, optical character recognition (OCR) technology may be applied to detected areas of a video signal that include text, and the text may then be displayed in a more readable font, displayed in a translated language, or rendered using voice synthesis technology.

15 Claims, 6 Drawing Sheets

DETECTION AND ENHANCEMENT OF IN-VIDEO TEXT

TECHNICAL FIELD

The present disclosure relates to video processing. More specifically, the present disclosure relates to detection of text such as subtitles or captions in input video data, and modification of output video data based on the detected text.

BACKGROUND

Captions and subtitles are added to video to describe or enhance video content using the written word. Subtitles are typically a transcription or translation of the dialogue spoken by the actors in a video. Captioning is intended to convey information for listening-impaired viewers, and typically contains non-speech information such as sound effects in addition to dialogue text. Captions and subtitles may be "open" or "closed." Open captions/subtitles are part of the video signal and cannot be turned on or off by the viewer, whereas closed captions/subtitles can be turned on or off based on user selection.

A number of technologies have been developed for delivery of captions and subtitles. Closed Caption (CC) technology has been widely used in the United States, and PAL Teletext has been used primarily in Europe. These caption technologies involve encoding text data in a non-visible portion of the video signal. In DVDs, subtitle data is stored as bitmaps, separate from the main video data. To generate an output video signal that includes subtitles, the main DVD video data is decoded, and then subtitle data is added to the main video data as a subpicture data stream.

Although subtitles and captions are intended to improve the viewer's understanding of the accompanied video, subtitles and captions can often be difficult to read. Difficulty in reading on-screen text can be attributed to a number of causes: the display in which the subtitles are displayed may be too small; the viewer may have poor eyesight or may be too great a distance from the display; the viewer may have difficulty with the language in which the text is displayed; the text may be poorly authored; the text may change too quickly; or the background on which the text is rendered may be of a color that makes reading the text difficult. Therefore, advancements in the readability and accessibility of on-screen text are required.

SUMMARY

The present disclosure relates to methods and apparatus for detecting text information in a video signal that includes subtitles, captions, credits, or other text. Additionally, the present disclosure relates to methods and apparatus for applying enhancements to the display of text areas in video. The sharpness and/or contrast ratio of subtitles of detected text areas may be improved. Text areas may be displayed in a magnified form in a separate window on a display, or on a secondary display. Further disclosed are methods and apparatus for extending the duration for which subtitles appear on the display, for organizing subtitles to be displayed in a scrolling format, for allowing the user to control when a subtitle advances to the next subtitle using a remote control, and for allowing a user to scroll back to a past subtitle in cases where the user has not finished reading a subtitle. Additionally, optical character recognition (OCR) technology may be applied to detected areas of a video signal that include text, and the text may then be displayed in a more readable font, displayed in a translated language, or rendered using voice synthesis technology.

BRIEF DESCRIPTION OF THE DRAWINGS

A more detailed understanding may be had from the following description, given by way of example in conjunction with the accompanying drawings wherein.

DETAILED DESCRIPTION

Figure 1:
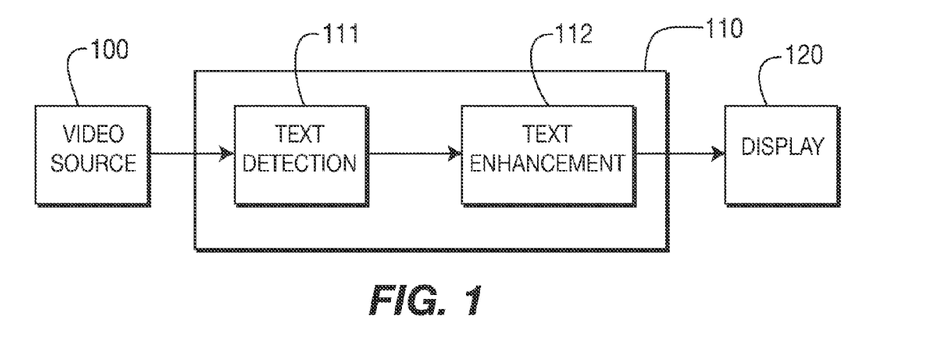
FIG. 1 is a block diagram of video source, video processing, and video display components.

FIG. 1 is a block diagram of video processing components configurable to operate in accordance with the disclosed subject matter. A video source component 100 is operatively connected to the video processing component 110. The video source component 100 may provide a video signal to the video processing component 110 through various types of inputs including S-video cable, coaxial cable, component video cable, YPbPr video cable, HDMI video cable, DVI video cable, serial ports, USB, Ethernet cable, and the like. The video signal may be encoded in formats including ATSC and NTSC.

The video source component 100 may be, for example, a cable box, media player such as a DVD or Blu-Ray player, set-top box, digital media library device, or other device for producing a video signal. The video processing component 110 may be configured to process the video signal according to the principles as shown in FIGS. 4-12 and to provide the resulting display signals to the display component 120.

The video processing component 110 may be, for example, an integrated circuit (IC), a system-on-a-chip (SOC), a software module for use with a general purpose computer, or an alternative type of component. The video processing component 110 includes a text-detection sub-module 111 and a text enhancement sub-module 112.

The display component 120 may be, for example, a monitor or television display, a plasma display, a liquid crystal display (LCD), or a display based on technologies such front or rear project, light emitting diodes (LED), organic light-emitting diodes (OLEDs), or Digital Light Processing (DLP).

The video processing component 110 and the display component 120 may include interfaces to receive user input, such as input from a remote control or other control device. The video processing component 110 and the display component 120 may be integrated into a single device. The integrated device may be, for example, a television or monitor. Alternatively, the video processing component 110 and the display component 120 may be implemented in physically distinct devices. For example, the video processing component 110 may be included in a set-top box or general purpose computer, and the display component 120 may be included in a separate television or monitor.

Figure 2:
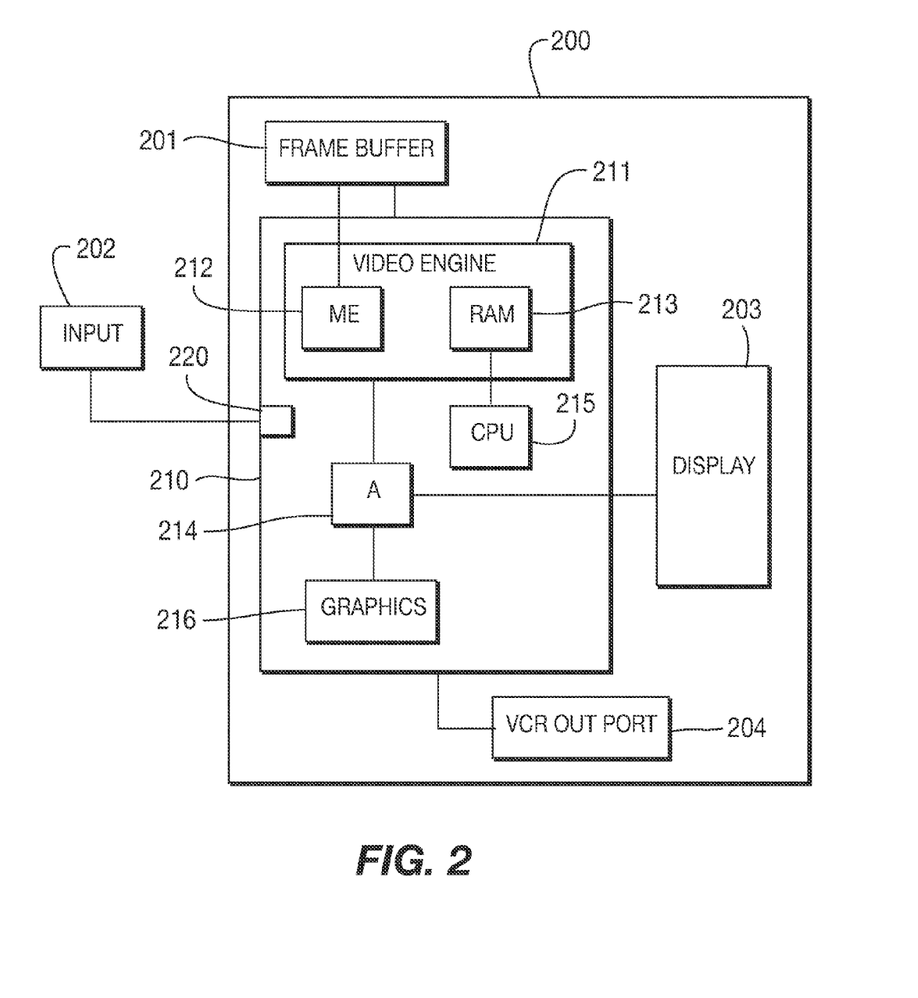
FIG. 2 is a block diagram of a video processing device.

FIG. 2 is a structural block diagram of a video processing device configurable to operate in accordance with the disclosed subject matter. A display 203 and a video processing device 210 are included in integrated device 200 which may be, for example, a television, monitor, or similar apparatus. Integrated device 200 is configured to process and display video as described hereinafter with respect to FIGS. 4-12. The video processing device 210 includes an input interface 220, a central processing unit (CPU) 215 (hereinafter referred to as a "processor"), an alpha (A) blender 214, a graphics block 216, and a video engine 211. The video engine 211 includes a random-access memory (RAM) 213 and a motion estimator 212.

The video processing device 210 receives an input video signal from video input device 202 at input interface 220. When a video signal is received, the video processing device 210 is configured to send the signal to the frame buffer 201. The motion estimator 212 is configured to receive frame data from the frame buffer 201. The motion estimator 212 is configured to generate motion vector data from the frame data, and to store the motion vector data in the RAM 213. The processor 215 is configured to process the motion vector data stored in the RAM 213. The processor 215 is also configured to use the video engine 211 to modify video data. For example, the video engine 211 may include a scaler and a sharpener (not shown) which may receive information directly or indirectly from the processor 215. The video processing device 210 may also include another RAM (not shown) coupled to the processor 215 and an additional video engine (not shown). The additional video engine may be used for a picture-in-picture display.

The video processing device 210 also includes an alpha (A) blender 214 and a graphics block 216. The graphics block 216 is configured to read graphics such as on-screen display (OSD) graphics and menus. The alpha blender 214 is configured to combine display signals from the video engine 211 and the graphics block 216, and to output the signal to the display 203 via one or more output interface components. The integrated device 200 may include additional components (not depicted) for receiving the signal from the alpha (A) blender 214 and driving the display 203.

Figure 3:
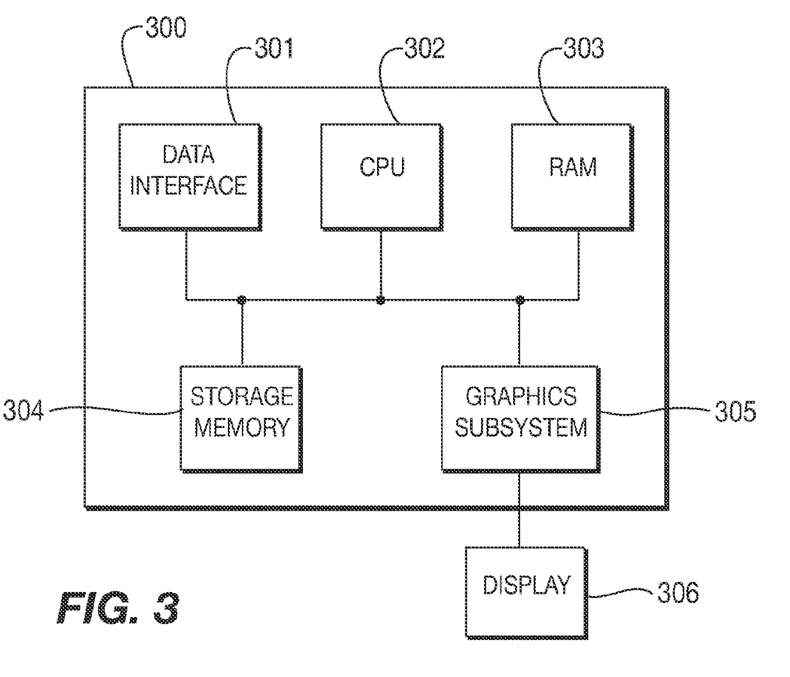
FIG. 3 is a block diagram of a general purpose computing device.

The methods and features to be described with reference to FIGS. 4-12 may additionally be realized using a general purpose computing device, such as the device depicted in FIG. 3. Referring to FIG. 3, the computing device 300 may receive video data through data interface 301. The data interface 301 may be, for example, a communications port or a wired or wireless network interface. The computing device 300 may include additional communications ports (not depicted). The computing device 300 further includes a central processing unit (CPU) 302, a RAM 303, a storage memory 304, and a graphics subsystem 305. The graphics subsystem 305 is connected to display 306, which is capable of rendering data sent from the graphics subsystem 305 in a visual format. The display 306 may be, for example, a television, monitor, or similar apparatus. The computing device 300 may include a number of additional components (not depicted) including specialized processing devices such as graphical processing units (GPUs).

Although features and elements are described herein with reference to subtitles, captions, and credits, the disclosed methods and apparatus are applicable to text included in a video frame regardless of the initial storage format of the text data, or whether the text is classifiable as captions, subtitles, credits, or any other form. As used herein, the terms "text area" and "text region" include geometric shapes with bounds that encompass text (such as captions, subtitles, credits, or other kinds of text) included in video content. As used herein, the term "video data" includes a representation of the graphics of video content. Video data may be represented as video frames, or in other formats. A video frame is a data structure that represents the graphical contents of a single image, where video content on the whole is made up of successive video frames. Video frames may include or be associated with timing and synchronization information indicating when the video frames should be displayed. Video data may also include audio data.

Figure 4:
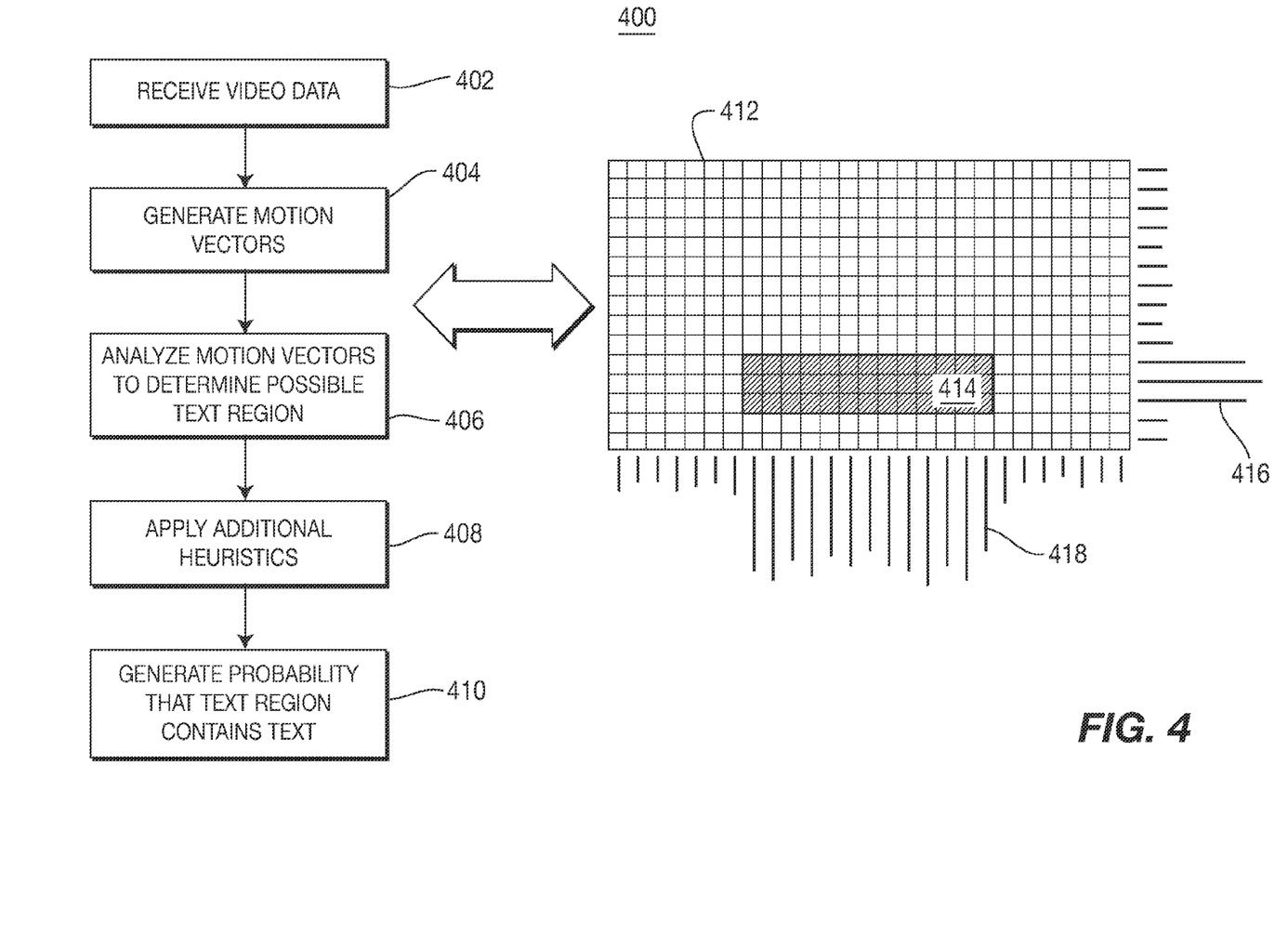
FIG. 4 is a flow diagram of a method for detecting a text region in video data, and shows an example motion vector map that may be generated during the detection of a text region.

FIG. 4 shows a method 400 for the detection of text in a video source. The video data may be obtained 402 from a frame buffer. Motion vectors are generated 404 from the video data. To generate motion vectors 404, the video data is divided into a grid. For each square/rectangle (each "motion vector region") in the grid, a motion vector is generated. Motion vectors are generated by comparing video associated with one point in time (time A) to video associated with at least one other point in time (time B) in a given motion vector region. The comparisons may be techniques based on SADs (Sum of Absolute Differences), PPC (Phase Plane Correlation), or any other technique for motion estimation or the generation or manipulation of motion vectors. A motion vector represents motion that occurred in the video region in both the horizontal and vertical directions (dx, dy). A motion vector may also include a description of the probability (a "confidence" value) that movement has occurred in a region of video content. Motion vectors with values of zero or near-zero tend to indicate the presence of video text. The motion vectors may be generated using a motion estimator device or by a software module executed by a processor.

The motion vectors may be included in a data structure such as example motion vector map 412. Each tile in the example motion vector map 412 represents a motion vector region in the video data. In the example motion vector map 412, a region 414 is shaded to indicate near-zero values for the motion vectors in the motion vector regions within the bounds of the region 414. To determine if the video data includes a text region 406, the motion vector map 412 may be analyzed to produce a histogram including data representing lines 416, 418. To generate example horizontal histogram lines 416, motion vector values are analyzed for the corresponding row in the motion vector map 412. The lengths of the histogram lines 416 are inversely proportional to the values of the motion vectors in the corresponding row. Accordingly, a longer line indicates a higher probability that the corresponding row in the motion vector map 412 includes text such as subtitles or captions. Similarly, columns in the motion vector map 412 may be analyzed on a per-column basis to generate values represented in the example histogram lines 418 beneath the motion vector map 412. Again, the longer lines indicate a lower probability of motion in the corresponding columns. Based on the values in example motion vector map 412, the example histogram lines 416, 418 are longer in the rows and columns which correspond to the region 414 containing motion vectors with near-zero values.

Histogram values may be analyzed 406 to determine the bounds of a potential text region in the video data. This may be accomplished by, for example, searching for a spikes or plateaus in histogram lines 416, 418 or motion vector values. Based on the bounds of associated motion vector regions, the bounds of a potential text region may be defined. Regarding motion vector map 412, for example, the bounds of region 414 may be defined based on the longer histogram lines 416, 418 in the columns and rows that correspond to region 414.

Additional heuristics may optionally be applied 408 to the video data, motion vector data (including associated probability values), and/or histogram values to further define a probability that the region includes text. For example, the bounds of a potential detected text region may be compared to the center of the video frame. Because subtitles or captions are typically horizontally centered in a video frame, this may be used to increase the probability that the region includes text. If human speech can be detected on the audio track at the time corresponding to the video frames, that may be used to increase the probability that the region includes text. Additionally, characteristics of the potential text region may be compared against characteristics of previously-detected text regions. For example, if a region is similar in color or dimensions with a previous text region that had a high probability of including text, that may be used to increase the probability that the region includes text. A final probability value indicating the probability that the region includes text is generated 410.

Figure 5:
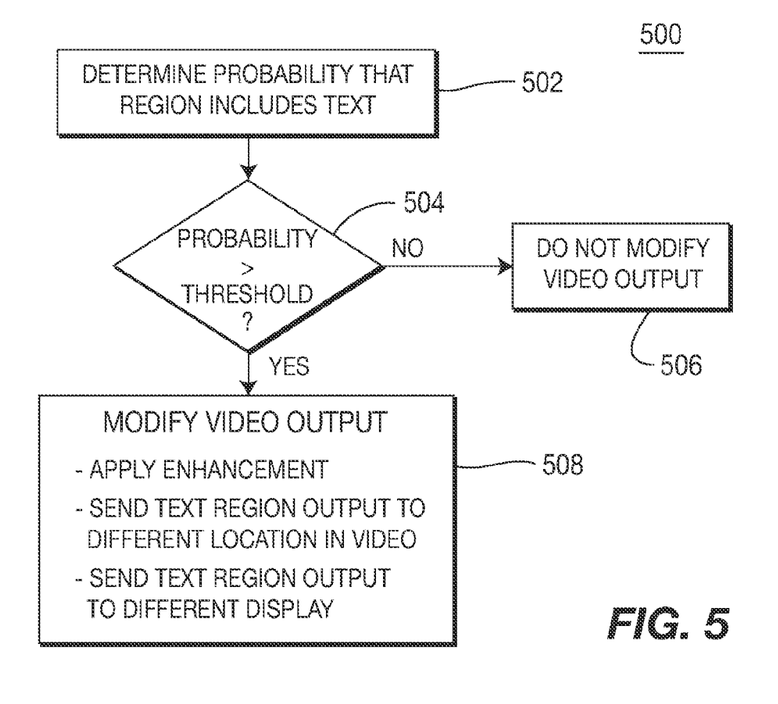
FIG. 5 is a flow diagram of a method for detecting a text region in an input video frame and applying one or more video enhancements to the detected region.

FIG. 5 is a flow diagram of a method 500 for detecting a text region in an input video frame and applying one or more video enhancements to the detected region. Input video data is received and a probability value is generated 502 indicating a probability that a region in the input video data contains text. This may be accomplished using a method as described with reference to FIG. 4 or using an alternate technique. The probability is compared 504 to a threshold. If a positive determination is made 504 that the probability is greater than the threshold, then output video data is generated 508 that includes modifications based on the detected text region. If a negative determination is made 504 that the probability is greater than the threshold, then the output video data is not modified 506.

As shown in FIG. 5, one or more enhancements may be applied 508 to a text region in output video data. For example, the sharpness and/or contrast ratio of the text region may be adjusted. This may be performed by defining a geometric region such as a rectangular window and changing the video enhancement settings within the defined region to settings designed to enhance subtitle readability. Additionally, the region may be defined to include a transition zone at its borders, such that enhancement settings change intensity gradually from the center of the region to the area of the display outside of the region.

Output video data may be modified 508 such that a text region is displayed in a magnified form in a separate window on a display where the main video data is displayed. This can be accomplished by using a picture-in-picture display feature of a video processing device, or alternatively by copying the text video region into the display's graphical overlay with a scale-bit operation. Sharpness and contrast ratio can be adjusted for the magnified text, and video enhancement settings may be applied to the region in which the magnified text is displayed.

Figure 6:
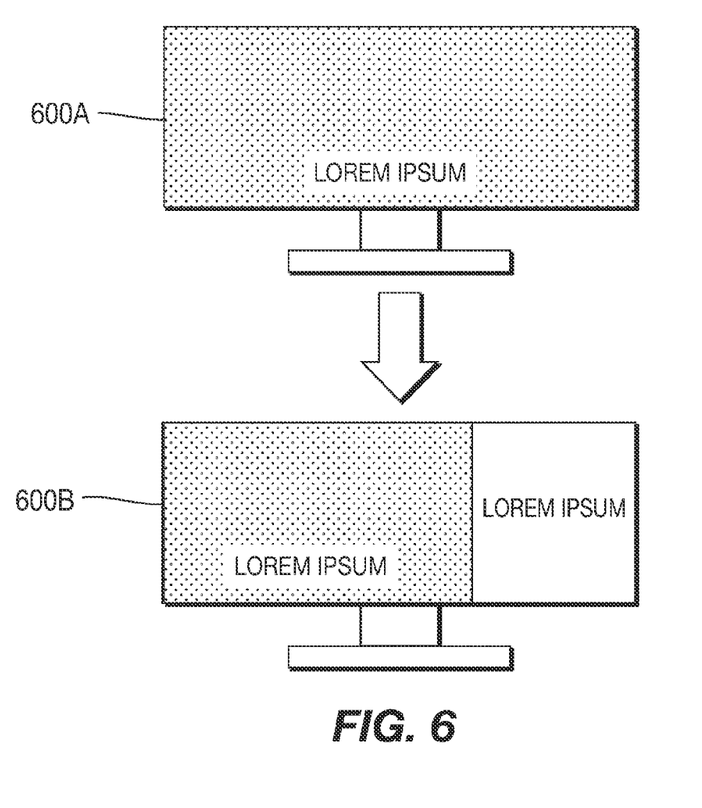
FIG. 6 is an example application of the method of FIG. 5, where video output includes main video data in an active region and detected text data in an inactive region.

Additionally, output video data may be modified 508 such that the main video data is displayed on a first side of an output frame, and the text region is displayed on a second side of the output frame. The text region may be enhanced as described above, and/or may be magnified. One of the sides of the frame may be an active area, and include the main video data. The other side may be an inactive area, and include no data other than the text region. An example of this is depicted in FIG. 6. The first display 600A shows the video data as originally received, including a text region. The second display 600B displays the modified video data. The left side of the second display 600B is active and includes the main video data. The right side of the second display 600B is inactive and shows the text region in a magnified form.

Figure 7:
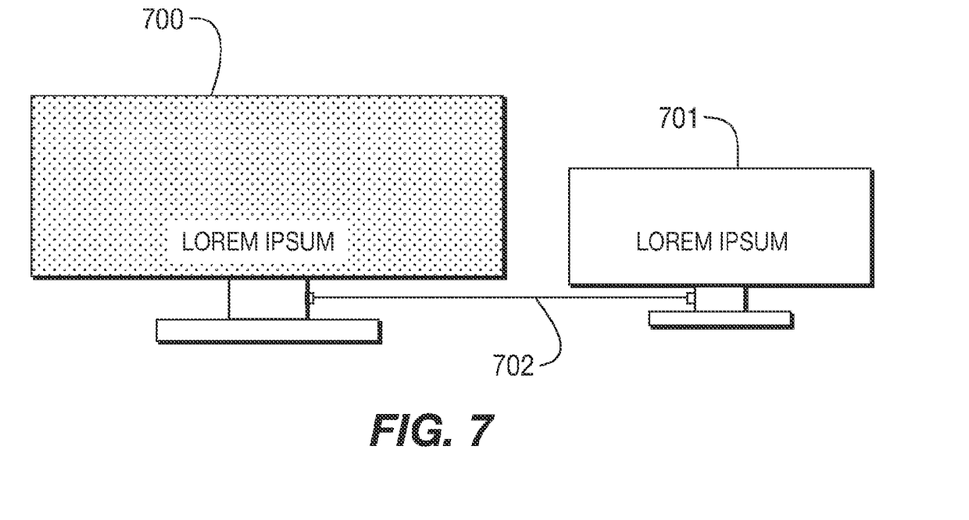
FIG. 7 is an example application of the method of FIG. 5, where main video output is displayed by a primary display and detected text data is displayed on a secondary display.

Referring again to FIG. 5, output video may be generated 508 indicating that a text region should be displayed on a secondary display. The text region may be displayed in a magnified form, and/or enhancements may be applied to the text region. This can be accomplished, for example, by using a "TV-Out" feature or other auxiliary output feature. The secondary display may be positioned close to the primary display, or may be positioned at a distance from the primary display. Additionally, the secondary display may be positioned such that it is visible to some viewers in the room but not to others. An example is depicted in FIG. 7. The primary display 700 displays a video frame (including a text region) according to the video data as originally received. The secondary display 701 is connected to the primary display 700 via a connector 702. Connector 702 may alternatively be a wireless connection. The secondary display 701 renders a detected text region in magnified form.

Figure 8:
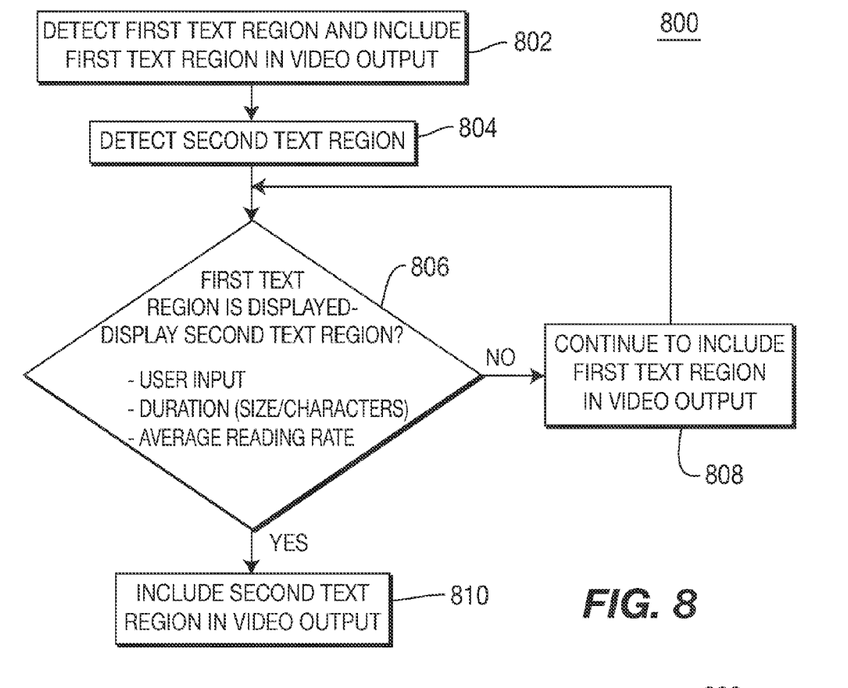
FIG. 8 is a flow diagram of a method for modifying the duration for which a text region is displayed.

FIG. 8 is a flow diagram of a method 800 for modifying the duration for which a text region is displayed. A first text region is detected in input video data, and is included in output video data 802. The output video data may be transmitted to a display and displayed to a user. Subsequent frames of video data are processed, and a second text region is detected 804 in the subsequent frames. The first and second text regions may be detected according to the method of FIG. 4, or by using a different technique. The second text region is identified as including different content from the content of the first text region by comparing its values to the values of the first text region. For example, color, size, shape, and other characteristics of the second text region may be compared against similar characteristics of the first region.

A determination is made 806 as to whether the first text region should continue to be included in output video data (and displayed), or whether the second text region should replace the first text region in the output data. This determination 806 may be based on a parameter such as whether input from a user has been received indicating that the next subtitle should be displayed. If a determination is made that the second text region should be included in the output video data, then the second text region is included in the output video data and the first text region is no longer included in the output video data 810. If a determination is made 806 that the first text region should continue to be included in the output video data, then the first text region is further included in the output video data and the second text region is not included in the output video data 808. The determination 806 may subsequently be repeated until the second text region is included in the output video data 810.

The determination 806 may be made based on whether the first text region has already been displayed for a time longer than a time threshold. The time threshold indicates how long the first text region should be included in the output video data. If the first text region has already been displayed for a time longer than the time threshold, then the first text region should no longer be displayed and the second text region should be included in the output video data 810. If the first text region has not yet been displayed for a time exceeding the time threshold, then the first text region should be further included in the output video data and the second text region is not yet included in the output video data 808.

The time threshold used to make the determination 806 may be based on different parameters. For example, the time threshold may be based on the size of the first text region. A larger text region would correspond to a longer time threshold, to allow a viewer a longer time to read. A smaller text region corresponds to a shorter display time value. Alternatively, the time threshold may be based on the number of characters included in the first text region. After a text region is detected, character-recognition technology may be used to count the number of characters in the region. A higher number of characters will correspond to a longer time threshold, and a lower number of characters will correspond to a shorter time threshold. Additionally, the time threshold may be based on an average reading rate parameter that indicates how long the user requires to read a text region. The determination 806 may be based on any combination or sub-combination of the factors as described above, and may also be based on additional other factors.

Figure 9:
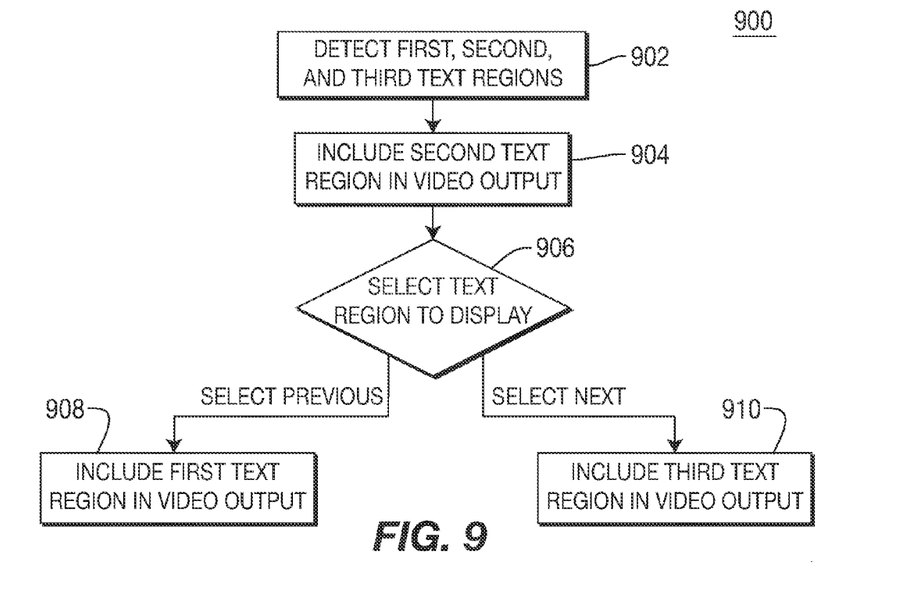
FIG. 9 is a flow diagram of a method for selecting between text regions included in video data.

FIG. 9 shows a method 900 for selecting between text regions included in video data. Three sequential text regions are detected 902. Although FIG. 9 shows three regions being detected, the principles of the method of FIG. 9 are applicable to more or less than three regions. The first text region may be included in output video data and displayed, and then second text region of the sequence is included 904 in output video data. While the second text region is included in the output video data and the second text region is displayed to a user, input from the user is received and processed 906. The user input may be received from, for example, a remote control. The user input is processed 906 and a selection is made regarding whether the preceding text region or the next text region should be displayed. If the user input indicates that the preceding text region should be displayed, subsequent generated video output will include the first text region 908. If the user input indicates that the next text region should be displayed, the video output then includes the third text region 910. Repetition of the method as depicted in FIG. 9 allows the user to rotate through, for example, the entire subtitle or caption contents of a length of video. Additionally, text regions may be detected and buffered as a frame-by-frame video data is received. If the entire data of a video is accessible to a processor, text regions may be detected before any output video data is generated or during the generation of output video data, such that a portion of the text region content of the video data (up to the entire text region content) may be pre-buffered.

Figure 10:
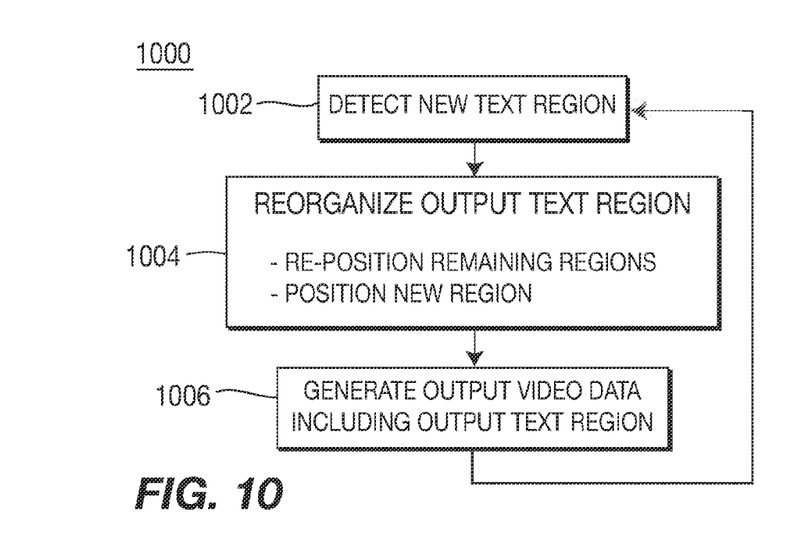
FIG. 10 is a flow diagram of a method for generating an output text region that includes input from multiple input text regions, arranged in a scrolling format.

FIG. 10 is a flow diagram of a method 1000 for generating an output text region that includes input from multiple input text regions, arranged in a scrolling format. A text output region may be generated from a combination of multiple text input regions, to display text to the viewer in a scrolling format. A parameter is defined, describing a maximum number of lines of text that may be included in the output text region. A new text region is detected 1002 in an input video frame, and the output text region is reorganized 1004. Reorganization of the output text region 1004 involves determining new positions of the previously-displayed regions and determining a position for the new region. Data describing the output text region is then generated 1006 based on the reorganized output text region. In the output data, the remaining regions may be shifted one line downward, and the new region may be added at the top line. The oldest-added text region may be shifted off of the output text region, so that it is no longer included in the output text region data 1006. Alternatively, the new region may be added at the bottom of the output region, and the previously-added text regions may be shifted upwards. As the shifting is performed, the output data may be generated 1006 such that viewer will see the text gradually scroll from the top of the output text area to the bottom of the output text area, or in the other direction as appropriate. Alternatively, the output data may be generated 1006 without a scrolling appearance, such that the changes in contents of the output text region are not rendered gradually. Additionally, the method of FIG. 10 may be performed with a horizontal orientation, such that the text scrolls from left to right or from right to left.

Figure 11:
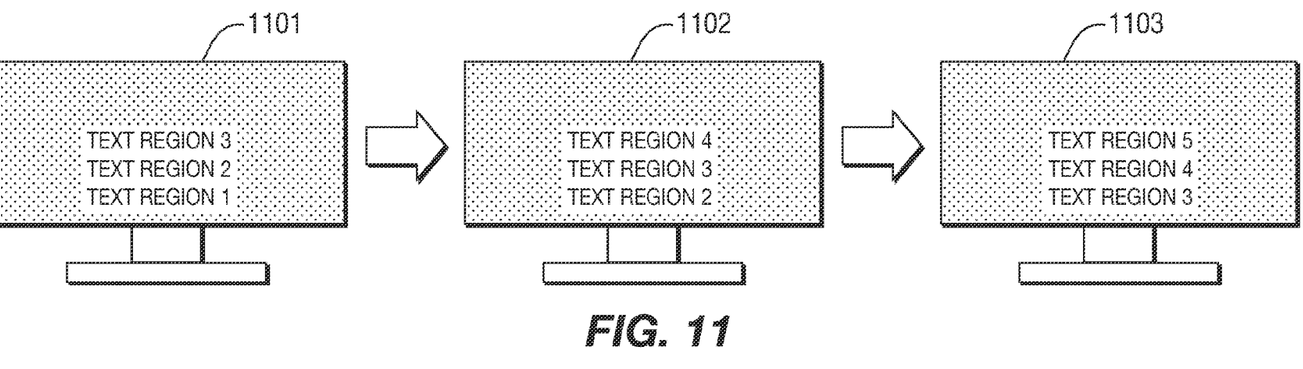
FIG. 11 shows an example application of the method of FIG. 10.

FIG. 11 shows an example application of the method of FIG. 10. Display 1101 shows output video data including an output text region, the output text region including the text from a first, second, and third text regions. A fourth text region is detected, and it is added to the output text region. The display 1102 shows output video data after the fourth text region is added. The text from the fourth region is at the top of the output area, and the previous text regions are shifted downwards. The text from the Region 1 is no longer included in the output text region. Subsequently, a fifth text region is detected. The display 1103 shows output video data after the fifth text region is added. The text from the fifth region is at the top of the output text area, and the previous text regions are shifted downwards. The text from the Region 2 is no longer included in the output text area. Additionally, one of skill in the art should realize that the shifting may be performed upwards or sideways, in either direction.

Figure 12:
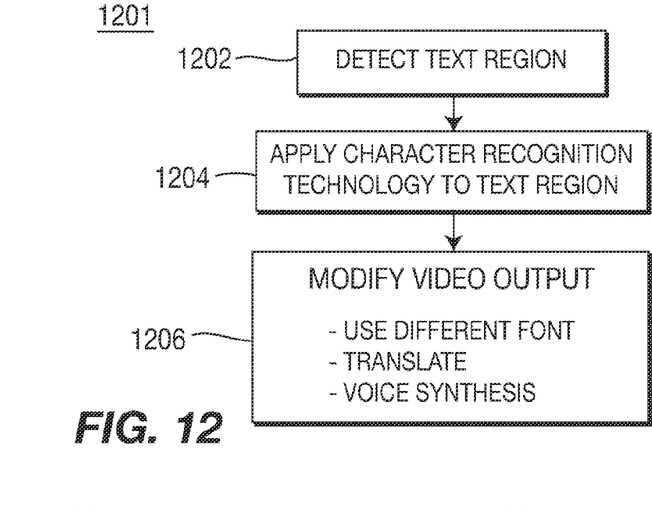
FIG. 12 is a flow diagram of a method for using character-recognition technology to generate text data from a detected text region, and to generate output video data based on the text data.

FIG. 12 is a flow diagram of a method 1200 for applying character recognition technology to a detected text region to generate text data and modified output video data. A text region is detected 1202 in input video data. A character recognition technique is applied 1204 to the text region to convert the text contents of the text region into a character-by-character representation. The generated text data may be encoded in ASCII, Unicode, or other text data formats. Optical character recognition (OCR) technology, for example, may be applied 1204 to a text region. To facilitate accurate OCR, additional processing of the detected text region may be performed. For example, a copy of the text region may be converted into a crisp black on white image, and then OCR may be performed on the converted image.

After character detection, the output video data is modified 1206 to include data based on the character values of the text in the detected region. The text output region may include a rendering of the text in a more readable font than originally used. The text may be translated into another language, and then text of the translated subtitles can be generated and included in the output text region.

After subtitles have been converted to a text representation by a character recognition technique, a voice synthesis technology may be applied 1206 to the text and a synthesized voice may render the text mixed with the audio track(s) of the video source. Alternatively, a voice synthesis technology may be applied 1206 to the text and a synthesized voice may render the text in an auxiliary audio output. The auxiliary output could drive audio output devices different from the audio output device rending the audio track(s) of the video, such as a pair of headphones.

Although features and elements are described above in particular combinations, each feature or element can be used alone without the other features and elements or in various combinations with or without other features and elements. The sub-elements of the methods and features as described above with respect to FIGS. 1-12 may be realized in any arbitrary order (including concurrently), in any combination or sub-combination. Sub-elements described with reference to any single Figure may be used in combination with the sub-elements described with reference to any other Figure or combination of other Figures. The methods or flow charts provided herein may be implemented in a computer program, software, or firmware incorporated in a computer-readable storage medium for execution by a general purpose computer, processor or computing device, including but not limited to computing devices as described with reference to FIGS. 1-3. In addition to storage media mentioned above, examples of computer-readable storage media which may be used in accordance with the principles of the current disclosure include a semiconductor memory devices such as a read only memory (ROM), a random access memory (RAM), or other semiconductor memory device, a register, cache memory, magnetic media such as internal hard disks and removable disks, magneto-optical media, and optical media such as CD-ROM disks, and digital versatile disks (DVDs), High-Definition/Density Digital Versatile Discs (HD-DVDs), and Blu-Ray Discs.

In addition to processor types mentioned above, suitable processors for use in accordance with the principles of the current disclosure include, by way of example, a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Arrays (FPGAs) circuits, any other type of integrated circuit (IC), and/or a state machine.

What is claimed is:

1. A video processing device, comprising:
    an input interface, configured to receive a video frame;
    a processor, configured to:
        modify the received video frame to generate an output video frame if a probability that the received video frame includes text exceeds a threshold; and
        generate the output video frame if the probability that the received video frame includes text is below the threshold; and
    an output interface, configured to display the output video frame.

2. The video processing device of claim 1, further comprising:
    a motion estimator, configured to generate a plurality of motion vectors based on the received video frame;
    wherein the processor is further configured to generate the probability based on an analysis of the plurality of motion vectors.

3. The video processing device of claim 1, wherein the processor is further configured to modify the received video frame by performing any one or more of:
    apply an enhancement to a region of the received video frame that includes the text;
    send the region of the received video frame that includes the text to a different location in the video frame; or
    send the region of the received video frame that includes the text to a different display.

4. The video processing device of claim 3, wherein the processor is further configured to apply the enhancement by performing any one or more of:
    adjust a sharpness or a contrast ratio of the region that includes the text;
    modify a duration for which the text is displayed;
    select among a plurality of text regions to be displayed;
    reorder a display order of the plurality of text regions; or
    apply character recognition to the text.

5. The video processing device of claim 4, wherein the processor is further configured to apply character recognition to the text by performing any one or more of:
    display the text in a different font;
    translate the text to a different language; or
    create an audio version of the text for a separate audio output.

6. A method for use in video processing, comprising:
    receiving a video frame;
    modifying the received video frame to generate an output video frame if a probability that the received video frame includes text exceeds a threshold;
    generating the output video frame if the probability that the received video frame includes text is below the threshold; and
    displaying the output video frame.

7. The method of claim 6, wherein the probability is determined by:
    generating a plurality of motion vectors based on the received video frame; and
    generating the probability based on an analysis of the plurality of motion vectors.

8. The method of claim 6, wherein the modifying includes any one or more of:
    applying an enhancement to a region of the received video frame that includes the text;
    sending the region of the received video frame that includes the text to a different location in the video frame; or
    sending the region of the received video frame that includes the text to a different display.

9. The method of claim 8, wherein the enhancement includes any one or more of:
    adjusting a sharpness or a contrast ratio of the region that includes the text;
    modifying a duration for which the text is displayed;
    selecting among a plurality of text regions to be displayed;
    reordering a display order of the plurality of text regions; or
    applying character recognition to the text.

10. The method of claim 9, wherein the applying character recognition to the text includes any one or more of:
    displaying the text in a different font;
    translating the text to a different language; or
    creating an audio version of the text for a separate audio output.

11. A non-transitory computer-readable storage medium storing a set of instructions for execution by a general purpose computer to perform method for use in video processing, the set of instructions comprising:
    a receiving code segment for receiving a video frame;
    a modifying code segment for modifying the received video frame to generate an output video frame if a probability that the received video frame includes text exceeds a threshold;
    a generating code segment for generating the output video frame if the probability that the received video frame includes text is below the threshold; and a displaying code segment for displaying the output video frame.

12. The non-transitory computer-readable storage medium of claim 11, wherein the probability is determined by:
   a second generating code segment for generating a plurality of motion vectors based on the received video frame; and
   a third generating code segment for generating the probability based on an analysis of the plurality of motion vectors.

13. The non-transitory computer-readable storage medium of claim 11, wherein the modifying code segment includes any one or more of:
   an applying code segment for applying an enhancement to a region of the received video frame that includes the text;
   a first sending code segment for sending the region of the received video frame that includes the text to a different location in the video frame; or
   a second code segment for sending the region of the received video frame that includes the text to a different display.

14. The non-transitory computer-readable storage medium of claim 13, wherein the enhancement includes any one or more of:
   an adjusting code segment for adjusting a sharpness or a contrast ratio of the region that includes the text;
   a second modifying code segment for modifying a duration for which the text is displayed;
   a selecting code segment for selecting among a plurality of text regions to be displayed;
   a reordering code segment for reordering a display order of the plurality of text regions; or
   a second applying code segment for applying character recognition to the text.

15. The non-transitory computer-readable storage medium of claim 14, wherein the second applying code segment includes any one or more of:
   a second displaying code segment for displaying the text in a different font;
   a translating code segment for translating the text to a different language; or
   a creating code segment for creating an audio version of the text for a separate audio output.

* * * * *